United States Patent Office 3,134,773
Patented May 26, 1964

3,134,773
PHENOTHIAZINE DERIVATIVES
Raymond Jacques Horclois, Malakoff, and Pierre Louis Sarret, Fontenay Sous Bois, France, assignors to Rhone-Poulenc S.A., Paris, France, a French body corporate
No Drawing. Filed Jan. 19, 1962, Ser. No. 167,442
Claims priority, application France Jan. 24, 1961
6 Claims. (Cl. 260—243)

This invention relates to new derivatives of phenothiazine, to a process for their preparation, and pharmaceutical compositions containing them.

During especially the past decade, considerable research and experimentation have been conducted in the field of N-substituted phenothiazine derivatives and certain of these compounds have been found to possess valuable therapeutic properties. Some are useful primarily on account of outstanding antihistaminic activity, others because of their unusually powerful effect as potentiators of drugs which act upon the nervous system and of their efficacy as anti-shock agents and yet others are, for example, effective agents for controlling or minimising motion-sickness. It has nevertheless been demonstrated that of the very large number of possible N-substituted phenothiazine compounds that have been proposed or tested by various workers, only comparatively few types have useful application in human or veterinary medicine and that both the nature and the degree of useful effect can radically alter even with apparently small changes in chemical structure.

It is an object of the present invention to provide new phenothiazine derivatives which possess useful pharmacological properties of a nature (hereinafter referred to in detail) and of a degree of activity that could not have been predicted from knowledge of their chemical structure.

The phenothiazine derivatives of the present invention are those which conform to the general formula:

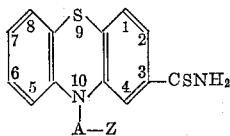

wherein A represents a divalent, straight or branched chain saturated hydrocarbon group containing two to six carbon atoms with at least two carbon atoms between the nitrogen atom of the phenothiazine nucleus and the group Z, Z represents an amino, monoalkylamino or dialkylamino group, or a nitrogen-containing heterocyclic group attached by a nitrogen atom to the hydrocarbon group A (such as an azetidino, pyrrolidino, morpholino, thiomorpholino, piperidino, hydroxypiperidino, hydroxyalkylpiperidino, carbamoylpiperidino, carbamoylalkylpiperidino, piperazino, N-alkylpiperazino, N-hydroxyalkylpiperazino, N-acyloxyalkylpiperazino or N-carbamoyloxyalkylpiperazino group, the carbamoyl substituent on the piperidino, alkylpiperidino and alkylpiperazino groupings optionally being substituted, for example by one or two alkyl groups, and one or more carbon atoms of the piperazino groups optionally carrying an alkyl group) and their acid addition salts. It is to be understood that in this specification and in the appended claims the words "alkyl" and "acyl" mean alkyl and acyl groups containing not more than five carbon atoms.

According to a feature of the present invention, the phenothiazine derivatives of Formula I are prepared by the process which comprises reacting in a liquid medium a 3-cyanophenothiazine derivative of the general formula:

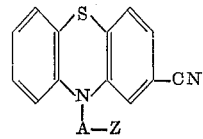

(wherein A and Z are as hereinbefore defined) with hydrogen sulphide to convert the 3-cyano substituent to a thiocarbamoyl group. The reaction is preferably carried out in the presence of a basic catalyst such as ammonium hydrogen sulphide or an alkali metal hydrogen sulphide. It may be effected in an ammoniacal alcoholic (e.g. ethanolic) solution or suspension saturated with hydrogen sulphide either at room tempearture with continuous introduction of hydrogen sulphide or at a temperature between 50° and 150° C. in a closed vessel. The ammonia in the solution or suspension can be replaced by an amine, for example, triethanolamine. Alternatively, the reaction may be carried out with a solution or suspension of the 3-cyanophenothiazine in pyridine in the presence of an amine such as triethylamine at room temperature or with gentle heating either with continuous introduction of hydrogen sulphide or in a closed vessel, the reaction medium then being first saturated with hydrogen sulphide.

Within the scope of the present invention is the conversion by known methods of a compound of general Formula I into another compound within the scope of the formula, for example, conversion of a compound where Z is an N-hydroxyalkylpiperazino group by acylation into a corresponding N-acyloxyalkylpiperazino compound.

The new phenothiazine derivatives of Formula I may be converted by known methods into acid addition salts. The acid addition salts may be obtained by the action of acids on the phenothiazine derivatives in appropriate solvents. As organic solvents there may be used, for example, alcohols, ethers, esters, ketones or chlorinated hydrocarbons; water may advantageously be used as an inorganic solvent. The acid addition salt which is formed is precipitated, if necessary after concentration of its solution, and is separated by filtration or decantation.

In this specification the term "known methods" means methods heretofore used or described in the chemical literature.

The new phenothiazine derivatives of the present invention and their non-toxic acid addition salts possess pharmacological properties; they are useful as neuroleptics (in particular as depressants and sedatives), antiemetics, adrenolytics and anti-tubercular compounds. Their utility as neuroleptics is enhanced by the absence of cataleptic effects. Of outstanding importance are those compounds in which the hydrocarbon chain A is

—(CH$_2$)$_3$— or

—CH$_2$—CH—CH$_2$—
　　　　|
　　　　CH$_3$ in particular 3-thiocarbamoyl-10-(3-dimethylamino - 2-methylpropyl)phenothiazine, 3-thiocarbamoyl-10-(3 - dimethylaminopropyl)phenothiazine, 3-thiocarbamoyl - 10-(3-4'-β-hydroxyethyl-1' - piperazinylpropyl)phenothiazine, 3-thiocarbamoyl-10-(3-1'-pyrrolidyl - 2 - methylpropyl)phenothiazine and 3-thiocarbamoyl-10(3-4'-hydroxy - 1'-piperidylpropyl)phenothiazine, and their non-toxic acid addition salts.

For therapeutic purposes, the bases of general Formula I are preferably employed as such or in the form of non-toxic acid addition salts, i.e. salts containing anions which are relatively innocuous to the animal organism in therapeutic doses of the salts (such as hydrochlorides and other hydrohalides, phosphates, nitrates, sulphates, acetates, propionates, succinates, benzoates, fumarates, maleates, citrates, tartrates, theophyllinates, theophyllinacetates, salicylates, phenolphthalinates, methanesulphonates, ethanedisulphonates, and methylene-bis-β-hydroxy-naphthoates) so that the beneficial physiological properties inherent in the bases are not vitiated by side-effects ascribable to the anions.

The following examples illustrate the invention:

Example I 3-cyano-10-(3-dimethylamino-2 - methylpropyl)phenothiazine (32.3 g.) is dissolved in anhydrous pyridine (50 cc.) and triethylamine (10.1 g.) and heated to about 50° C. A current of hydrogen sulphide is passed into this solution for 6 hours and water (100 cc.) and chloroform (100 cc.) added. After separating, the chloroform layer is washed with water (5 × 50 cc.) and the chloroform solution dried over potassium carbonate and concentrated in vacuo. The residue is then dissolved in ethanol (150 cc.), treated with decolourising charcoal and filtered. On cooling, yellow crystals of 3-thiocarbamoyl-10-(3-dimethylamino-2-methylpropyl)phenothiazine (28.6 g.) are obtained, M.P. 160° C. after recrystallisation from ethanol.

Example II

A mixture of 3-cyano-10-(3-dimethylamino-2-methylpropyl)phenothiazine (8.1 g.) and ethanol (40 cc.) containing ammonia (50 g. per litre) is heated in a pressure bottle. A current of hydrogen sulphide is passed into the solution obtained until it is saturated. The bottle is then sealed and heated at 100° C. for 15 hours. After cooling, the solution is concentrated and taken up in water and diethyl ether. On recrystallisation from benzene (50 cc.) and cooling, yellow crystals of 3-thiocarbamoyl-10-(3-dimethylamino-2-methylpropyl)phenothiazine (6.5 g.) are obtained, M.P. 160° C. after recrystallisation from isopropanol.

Example III

Proceeding as in Example I but commencing with 3-cyano-10-(3 - dimethylaminopropyl)phenothiazine (61.8 g.), 3 - thiocarbamoyl-10-(3-dimethylaminopropyl)phenothiazine (57 g.) is obtained, M.P. 162° C. after recrystallisation from methanol.

Example IV

Proceeding as in Example I but commencing with 3-cyano-10-(3-4'-β-hydroxyethyl - 1' - piperazinylpropyl)-phenothiazine (26.7 g.), yellow crystals are obtained of 3 - thiocarbamoyl-10-(3-4'-β-hydroxyethyl-1'-piperazinylpropyl)phenothiazine (24.5 g.), M.P. 120° C. after recrystallisation from acetone.

Example V 3-cyano-10-(3-1'-pyrrolidyl - 2 - methylpropyl)phenothiazine (21 g.) is stirred with anhydrous pyridine (30 cc.) and triethylamine (6 g.) and a current of hydrogen sulphide passed in for 7 hours. During the first 30 minutes, the reaction mass heats-up spontaneously and then is heated on a water-bath so that the internal temperature is kept at about 55° C. On cooling, the crystals formed are filtered off and washed with pyridine (10 cc.) (yield 7.9 g. of crystals). The mother liquors are then poured into distilled water (250 cc.) and the solid which forms is filtered off and washed with water (3 × 50 cc.) followed by methanol (20 cc.), giving a second crop of product (14 g.).

The total yield of product (21.9 g. of crystals) is then recrystallised, first in n-butanol (130 cc.) and then in monochlorobenzene (40 cc.). The crystals are washed in ether and dried in vacuo at 80° C. giving 3-thiocarbamoyl-10 - (3-1'-pyrrolidyl-2-methylpropyl)phenothiazine (17.5 g.) in the form of a yellow crystalline powder, M.P. 190° C.

Example VI 3-cyano-10-(3-4'-hydroxy - 1' - piperidylpropyl)phenothiazine (25 g.) is stirred in pyridine (30 cc.) and triethylamine (7 g.) and a current of hydrogen sulphide passed in for 8 hours, the internal temperature of the reaction mixture being kept at about 55° C. The reaction product is poured into water (500 cc.) and stirred with chloroform (200 cc.). The insoluble crystals formed are filtered off and recrystallised from ethanol (1000 cc.) giving a first crop of 3-thiocarbamoyl-10-(3-4'-hydroxy-1'-piperidylpropyl)phenothiazine (20 g.) as a yellow crystalline powder, M.P. 176° C.

The present invention further includes within its scope pharmaceutical compositions which comprise one or more compounds of general Formula I or non-toxic acid addition salts thereof together with a pharmaceutical carrier or coating. In clinical practice the compounds of the present invention will normally be administered orally, rectally or parenterally.

Solid compositions for oral administration include compressed tablets, pills, dispersible powders, and granules. In such solid compositions one or more of the active compounds is, or are, admixed with at least one inert diluent such as calcium carbonate, potato starch, alginic acid, or lactose. The compositions may also comprise, as is normal practice, additional substances other than inert diluents, e.g. lubricating agents, such as magnesium stearate. Liquid compositions for oral administration include pharmaceutically acceptable emulsions, solutions, suspensions, syrups and elixirs containing inert diluents commonly used in the art, such as water and liquid paraffin. Besides inert diluents such compositions may also comprise adjuvants, such as wetting and suspending agents, and sweetening, flavouring, perfuming and preserving agents. The compositions according to the invention, for oral administration, also include capsules of absorbable material such as gelatin containing one or more of the active substances with or without the addition of diluents or excipients.

Solid compositions for rectal administration include suppositories formulated in manner known per se and containing one or more of the active compounds.

Preparations according to the invention for parenteral administration include sterile aqueous or non-aqueous solutions, suspensions, or emulsions. Examples of non-aqueuos solvents or suspending media are propylene glycol, polyethylene glycol, vegetable oils such as olive oil, and injectable organic esters such as ethyl oleate. These compositions may also contain adjuvants such as preserving, wetting, emulsifying and dispersing agents. They may be sterilised by, for example, filtration through a bacteria-retaining filter, by incorporation in the compositions of sterilising agents, by irradiation, or by heating. They may also be manufactured in the form of sterile solid compositions, which can be dissolved in sterile water or some other sterile injectable medium immediately before use.

The percentage of active ingredient in the compositions of the invention may be varied, it being necessary that it should constitute a proportion such that a suitable dosage for the therapeutic effect desired shall be obtained. Obviously several unit dosage forms may be administered at about the same time. In general, the preparations should normally contain at least 0.025% by weight of active substance when required for administration by injection; for oral administration the preparations will normally contain at least 0.1% by weight of active substance. In human therapy the compositions should generally be administered so as to give to an adult weighing about 60 kg., in the case of oral administration, 20 to 600 mg. of active substance (calculated as base) per day and, in the case of parenteral administration, 10 to 500 mg. (calculated as base) per day.

The following examples illustrate pharmaceutical compositions according to the invention.

*Example VII*

Tablets (200 mg.) are prepared containing:

| | Mg. |
|---|---|
| 3-thiocarbamoyl - 10 - (3 - dimethylaminopropyl)-phenothiazine | 25 |
| Starch | 142 |
| Finely powdered silica | 30 |
| Magnesium stearate | 3 |

*Example VIII*

Tablets (150 mg.) are prepared containing:

| | Mg. |
|---|---|
| 3-thiocarbamoyl - 10 - (3 - dimethylaminopropyl)-phenothiazine | 10 |
| Starch | 107 |
| Powdered silica | 30 |
| Magnesium stearate | 3 |

We claim:

1. A phenothiazine derivative selected from the group consisting of phenothiazine derivatives of the formula:

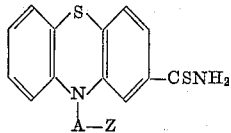

wherein A represents a member selected from the group consisting of —(CH₂)₃— and

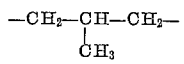

and Z represents a member selected from the group consisting of amino, monoalkylamino, dialkylamino, azetidino, pyrrolidino, morpholino, thiomorpholino, piperidino, hydroxypiperidino, hydroxyalkylpiperidino, carbamoylpiperidino, carbamoylalkylpiperidino, piperazino, N-alkylpiperazino, N-hydroxyalkylpiperazino, N-acyloxyalkylpiperazino and N-carbamoyloxyalkylpiperazino, the said alkyl and acyl groups containing a maximum of five carbon atoms, and non-toxic acid addition salts thereof.

2. 3-thiocarbamoyl-10-(3-dimethylamino - 2 - methylpropyl)phenothiazine.

3. 3 - thiocarbamoyl - 10 - (3-dimethylaminopropyl)-phenothiazine.

4. 3-thiocarbamoyl - 10 - (3-4'-β-hydroxyethyl-1'-piperazinylpropyl)phenothiazine.

5. 3-thiocarbamoyl - 10 - (3-1'-pyrrolidyl-2-methylpropyl)phenothiazine.

6. 3-thiocarbamoyl - 10 - (3-4'-hydroxy-1'-piperidylpropyl)phenothiazine.

References Cited in the file of this patent

UNITED STATES PATENTS

| 2,928,767 | Gulesich et al. | Mar. 15, 1960 |
| 2,956,996 | Craig | Oct. 18, 1960 |

FOREIGN PATENTS

| 203,503 | Austria | May 25, 1959 |
| 1,212,031 | France | July 4, 1960 |

OTHER REFERENCES

Lowy et al.: An Introduction to Organic Chemistry, 6th ed., page 213, John Wiley and Sons, Inc., New York (1945).